United States Patent
Pandit et al.

(10) Patent No.: US 7,671,113 B2
(45) Date of Patent: Mar. 2, 2010

(54) PROCESS FOR THE PREPARATION OF NANOSCALE PARTICLES OF ELASTIC MATERIAL

(75) Inventors: Aniruddha B. Pandit, Maharashtra (IN); Mohan Narayan Patil, Maharashtra (IN)

(73) Assignee: University Institute of Chemical Technology, Maharashtra (IN)

( * ) Notice: Subject to any disclaimer, the term of this patent is extended or adjusted under 35 U.S.C. 154(b) by 1 day.

(21) Appl. No.: 12/006,591

(22) Filed: Jan. 3, 2008

(65) Prior Publication Data

US 2009/0176957 A1 Jul. 9, 2009

(51) Int. Cl.
*B01F 3/12* (2006.01)
*C08J 3/02* (2006.01)
*C08F 236/10* (2006.01)

(52) U.S. Cl. .......... 523/322; 523/319; 528/502 C; 977/788

(58) Field of Classification Search .......... 523/322, 523/319; 977/788; 528/502 C
See application file for complete search history.

(56) References Cited

U.S. PATENT DOCUMENTS

| | | | |
|---|---|---|---|
| 6,365,555 B1 * | 4/2002 | Moser et al. | 505/441 |
| 6,723,774 B2 * | 4/2004 | Guntherberg et al. | 524/458 |
| 7,465,241 B2 * | 12/2008 | Comeau et al. | 473/378 |

OTHER PUBLICATIONS

Liu, et al, Special Effect of Ultra-Fine Rubber Particles on Plastic Toughening, Chinese Journal of Polymer Science, vol. 20, No. 2 (2002) 93-98.*

* cited by examiner

*Primary Examiner*—Fred M Teskin
(74) *Attorney, Agent, or Firm*—Ladas and Parry LLP

(57) ABSTRACT

The present invention discloses a method for the manufacture of nanoscale particles of Styrene Butadiene Rubber (SBR). As SBR particles are elastic in nature, conventional methods of size reductions such as impacting, grinding are unable to achieve the final size. The present invention successfully achieves size reduction of the elastic material to nano scale by carefully controlled hydrodynamic cavitation techniques.

11 Claims, 2 Drawing Sheets

Ultrasonic bath Sonication set up

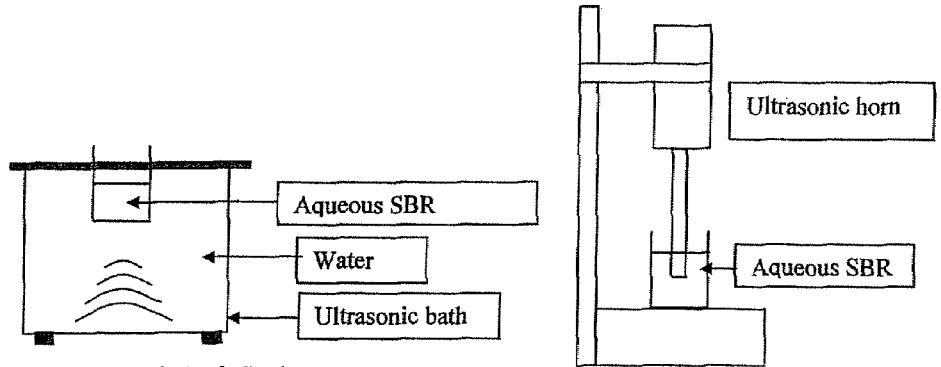
Figure 1 Ultrasonic bath Sonication set up
Figure 2 Ultrasonic horn Sonication set up
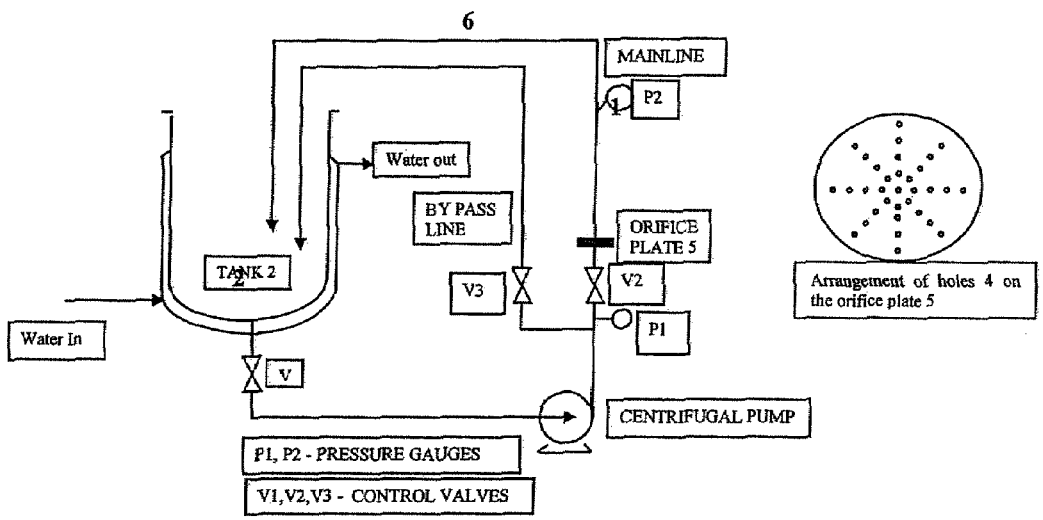
Figure 3 Schematic representation of HC 1 set-up
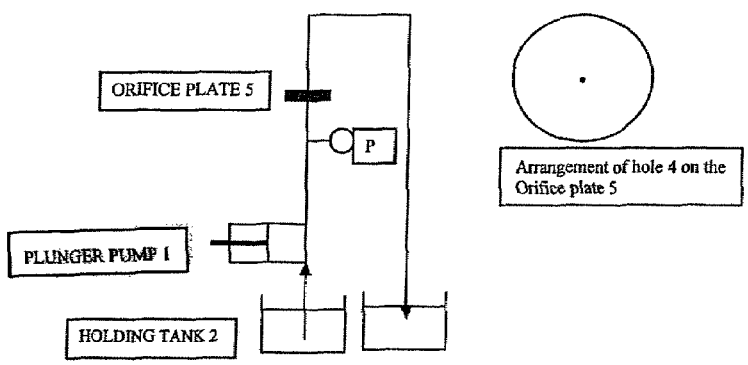
Figure 4 Schematic representation of HC 2 set-up

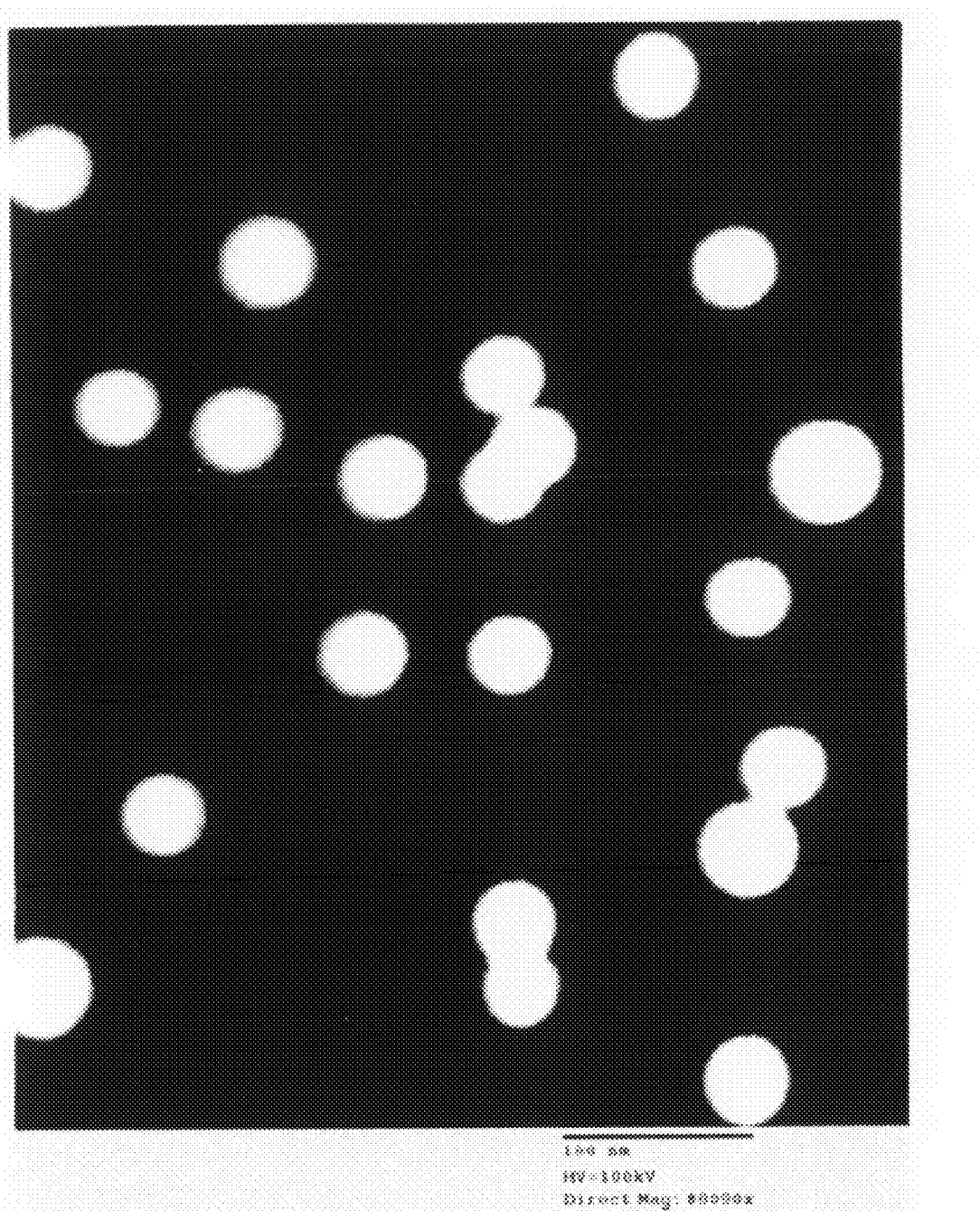
Figure 5. SEM Image of rubber latex particles.

PROCESS FOR THE PREPARATION OF NANOSCALE PARTICLES OF ELASTIC MATERIAL

FIELD OF THE INVENTION

The present invention relates to a process for the preparation of nanoscale particles of elastic material. More particularly, the present invention relates to a process for the preparation of nanoscale particles of elastic material such as Styrene Butadiene Rubber. In particular, the present invention relates to a process for the preparation of nanoscale particles of elastic material such as Styrene Butadiene Rubber (SBR) by cavitation techniques. Even more particularly, the present invention relates to a process for the preparation of nanoscale particles of elastic material such as Styrene Butadiene Rubber employing hydrodynamic cavitation techniques.

BACKGROUND OF THE INVENTION AND PRIOR ART

Nanosuspensions have emerged as a promising strategy for an efficient delivery of hydrophobic drugs because of their versatile features such as very small particle size. Methods such as media milling and high-pressure homogenization have been used commercially for producing nanosuspensions [V. B. Patravale, A. A. Date, R. M. Kulkarni, *Journal of Pharmacy and Pharmacology*, Vol. 56, No. 7, pages 827 (2004)]. The engineering of nanosuspensions employing emulsions and microemulsions as templates has been addressed in the above literature. The unique features of nanosuspensions have enabled their use in various dosage forms, including specialized delivery systems such as mucoadhesive hydrogels. Rapid strides have been made in the delivery of nanosuspensions by parenteral, peroral, ocular and pulmonary routes. Currently, efforts are being directed to extending their applications in site-specific drug delivery.

The ability to produce the nanoparticles of desired size with great precision (narrow size distribution and small variation) is the key factor of producing the nanosuspensions. The process of producing nanoparticles can be categorised by two approaches:

The Top-Down approach—where one starts with the bulk material and machines it, way down to the nano-scale, and The Bottom-Up approach, starting at the molecular level and building up the material through the small cluster level to the nanoparticle and finally the assembly of nanoparticles.

Theory of Cavitation

Cavitation is the phenomenon of sequential formation, growth and collapse of millions of microscopic vapour bubbles (voids) in the liquid. The collapse or implosion of these cavities creates high localized temperatures roughly of 14000 K and a pressure of about 10000 atm or results into short-lived, localized hot-spot in cold liquid. Thus, cavitation serves as a means of concentrating the diffused fluid energy locally and in very short duration, creating a zone of intense energy dissipation [Suslic K. S., J. J., Gawlenowski, P. F. Schubert and H. H. Wang, *J. Phy. Chem.* 87, 2299 (1983)].

Acoustic Cavitation

Cavitation is induced by passing high frequency (16 kHz-100 MHz) sound waves i.e., ultrasound through liquid media. When ultrasound passed through the liquid media, in the rarefaction region local pressure falls below the threshold pressure for the cavitation (usually the vapour pressure of the medium at the operating temperature), millions of the cavities are generated. In the compression region the pressure in the fluid rises and these cavities are collapsed. The collapse conditions are dependent on the intensity and frequency of the ultrasound as well as liquid physical properties, temperature of the liquid and the dissolves gases [J. P. Lorimer and T. J. Mason, *Chem. Soc. Rev.* 16, 239-274 (1987)].

Hydrodynamic Cavitation

Hydrodynamic cavitation can simply be generated by the passage of the liquid through a specified geometry of constriction such as orifice plates, ventury etc. When the liquid passes through the constriction, the kinetic energy of the liquid increases at an expense of the pressure. If the throttling is sufficient to cause the pressure around the point of vena contracta to fall below the threshold pressure for the cavitation (usually the vapour pressure of the medium at the operating temperature) millions of the cavities are generated. Subsequently, as the liquid jet expands, the pressure recovers and this results in the collapse of the cavities releasing the energy in the form of a high magnitude pressure pulse. During the passage of the liquid through the constriction, the boundary layer separation occurs and substantial amount of the energy is lost in the form of turbulence and permanent pressure drop [P. R. Gogate and A. B. Pandit, *Rev. in Chem. Engg.* 17(1), 2001, 1-85].

Very high intensity of the turbulence, downstream side of the constriction is generated and its intensity depends on the magnitude of the permanent pressure drop, which again depends on the geometry of the constriction and the flow conditions in the liquid. The intensity of the turbulence has a profound effect on the cavitation activity and the intensity as shown by Moholkar and Pandit [V. S. Moholkar and A. B. Pandit, *AICHE J.* 43 (6) 1997, 1641-1648]. A dimensionless number known as cavitation number (Cv) is used to relate the flow conditions with the cavitation intensity as follows, $$Cv = \frac{P_2 - P_v}{\frac{1}{2}\rho V_o^2} \qquad \text{Eq (1)}$$

where $P_2$ is the recovered downstream pressure; $P_v$ is the vapour pressure of the liquid and $V_o$ is the liquid velocity at the orifice. The cavitation number at which the inception of cavitation occurs is known as the cavitation inception number $C_{vi}$. Ideally speaking, the cavitation inception should occur at 1.0. But Harrison and Pandit [S. T. L. Harrison and A. B. Pandit, *Proceedings of 9th Int. Biotech. Symp.*, Washington, USA 1992] have reported that, generally the inception of the cavitation occurs from 1.0-2.5. This has been attributed to the presence of the dissolved gases in the flowing liquid. Yan and Thorpe [Y. Yan and R. B. Thorpe, *International Journal of Multiphase Flow*, Volume 16, Issue 6, November-December 1990, Pages 1023-1045.] have shown that Cv is a function of the flow geometry and usually increases with an increase in the size of the opening in a constriction such as an orifice in a flow.

Advantages of hydrodynamic cavitation over acoustic cavitation have been reported as follows [P Senthilkumar, *M. Chem. Engg. Thesis, MUICT*, Mumbai, 1997]:

It is one of the cheapest and energy efficient methods of generating cavitation.

The equipment used for generating cavitation is simple.

The scale up of the system is relatively easy.

Theory of Size Reduction:

To reduce a material's particle size, large particles or lumps must be fractured into smaller particles. To initiate fractures, external forces are applied to the particles. Generally, the extent of particle size reduction caused by an external force depends on the amount of energy supplied to the particle, the rate at which it's supplied, and the manner in which it's supplied. The application of size-reduction forces can be broken into the following four categories [S. Wennerstrum, T. Kendrick, J. Tomaka, and J. Cain, *Powder and Bulk Engineering*, January 2005, pp 1-5].

Impact milling: Impact milling occurs when a hard object that applies a force across a wide area, hits a particle with a certain momentum to fracture it. The least size obtained by an impact mills is of the order of 50 microns for mechanical impact mills and less than 10 microns for fluid jet mills [S. Wennerstrum, T. Kendrick J. Tomaka, and J. Cain, *Powder and Bulk Engineering*, January 2005, pp 1-5].

Attrition milling: In attrition milling, non erodable grinding media continuously contact the material to be ground, systematically grinding its edges down. Attrition mills can reduce 1000 micron (20 mesh) particles of friable materials such as chemicals and minerals down to less than 1 micron. One such type is the media mill (also called a ball mill) [S. Wennerstrum, T. Kendrick, J. Tomaka, and J. Cain, *Powder and Bulk Engineering*, January 2005, pp 1-5].

Knife milling: In knife milling, a sharp blade applies high, head-on localised shear force to a large particle, cutting it to a predetermined size to create smaller particles and minimize fines. Knife mills can reduce 2 inch or larger chunks or slabs of material, including elastic or heat-sensitive materials down to 250 to 1,200 microns [S. Wennerstrum, T. Kendrick, J. Tomaka, and J. Cain, *Powder and Bulk Engineering*, January 2005, pp 1-5].

Direct pressure milling: Direct pressure milling occurs when a particle is crushed or pinched between two hardened surfaces. Direct-pressure mills typically reduce 1-inch or larger chunks of friable materials down to 800 to 1,000 microns.

Most mills use a combination of these principles to apply more than one type of force to the particle to be ground. The very important part is to choose the best type of size reduction mode based on the characteristics of the material to be processed and initial and final size requirements.

The physical properties of the material to be reduced are also important to decide the method and the equipment to be used for reducing it. Nonfriable materials such as polymers, resins, waxes, and rubber can't be shattered or fractured using regular impact or direct-pressure milling. Knife milling often cannot reduce a nonfriable material to a very fine particle size range. Typical methods, for reducing nonfriable materials require turning the nonfriable material into a friable material by freezing it below glass transition temperature. In certain cases, preconditioning or exposing the particles to a cryogen may be necessary. For low temperature milling with cryogens, care of the components of the equipment is very important as they also become brittle and certain lubricating greases lose their viscosity and freeze [9].

Use of Cavitation in Nanotechnology:

The extreme transient conditions generated in the vicinity and within the collapsing cavitational bubbles have been used for the size reduction of the material to the nano scale. Nanoparticles synthesis techniques include sonochemical processing, cavitation processing, and high-energy ball milling. In sonochemistry, an acoustic cavitation process can generate a transient localized hot zone with extremely high temperature gradient and pressure [K. S. Suslick, T. W. Hyeon, M. W. Fang, *Chem Mater.* 8 (1996) 2172]. Such sudden changes in temperature and pressure assist the destruction of the sonochemical precursor (e.g., organometallic solution) and the formation of nanoparticles. The technique in principle can be used to produce a large volume of material for industrial applications but no reports are available in the open literature.

Use of the cavitation for the formation of the Nanoparticles has been reported by Suslick [K. S. Suslick, S. B. Choe, A. A. Cichowlas, M. W. Grinstaff, *Nature,* 353 (1991) 414]. He sonicated $Fe(CO)_5$ either as a neat liquid or in a decalin solution and obtained 10-20 nm size amorphous iron particles. Similar experiments have been reported for the synthesis of the Nanoparticles of many other inorganic materials using acoustic cavitation [A. Gedanken, *Ultrasonics Sonochemistry* 11 (2004), pp 47-55]. To understand the mechanism of the formation of the Nanoparticles during the cavitation phenomenon, Hot-Spot theory has been convincingly used. It explains the adiabatic collapse of a bubble, producing the hot spots. This theory claims that very high temperatures (5000-25,000 K) [A. Gedanken, *Ultrasonics Sonochemistry* 11 (2004), pp 47-55.] are obtained upon the collapse of the bubble. Since this collapse occurs in few microseconds (final adiabatic phase), very high cooling rates, (in excess of $10^{11}$ K/s), have been obtained. These high cooling rates hinder the organization and crystallization of the products. For this reason, in all the cases dealing with volatile precursors, where gas phase reactions are predominant, amorphous Nanoparticles have been obtained [A. Gedanken, *Ultrasonics Sonochemistry* 11 (2004), pp 47-55]. While the explanation for the creation of amorphous products is well understood, the reason for the formation of nanostructured products under cavitation is not yet clear. One possible explanation is that the fast kinetics does not permit the growth of the nuclei, and in each collapsing bubble a few nucleation centers are formed whose growth is limited by the short cavity collapse time. If, on the other hand, the precursor is a non-volatile compound, the reaction occurs in a 200 nm ring surrounding the collapsing bubble [K. S. Suslick, D. A. Hammerton, R. E. Cline, *J. Am. Chem. Soc.* 108 (1986) 5641]. In this case, the sonochemical reaction occurs in the liquid phase and not inside the collapsing cavity. The products are sometimes nanoamorphous particles, and in other cases, nanocrystalline. This depends on the temperature in the fluid ring region where the reaction takes place. The temperature in this liquid ring is lower than that inside the collapsing bubble, but higher than the temperature of the bulk liquid. Suslick [K. S. Suslick, S. B. Choe, A. A. Cichowlas, M. W. Grinstaff, *Nature,* 353 (1991) 414] has estimated the temperature in the ring region as around 1900° C. In short, in almost all the sonochemical reactions leading to inorganic products, nanomaterials have been obtained. They vary in size, shape, structure, and in their solid phase (amorphous or crystalline), but they were always of nanometer size. [A. Gedanken, *Ultrasonics Sonochemistry* 11 (2004), pp 47-55]. Cavitation being a nuclei dominated (statistical in nature) phenomenon, such variations are expected.

In hydrodynamic cavitation, nanoparticles are generated through the creation and release of gas bubbles inside the sol-gel solution [I. E. Sunstrom, IV, W. R. Moser, B. M. Guerts, *Chem Mater* 8 (1996) 2061]. By rapidly pressurizing in a supercritical drying chamber and exposing it to the cavitational disturbance and high temperature heating, the sol-gel solution is rapidly mixed. The erupting hydrodynamically generated cavitating bubbles are responsible for the nucleation, the growth of the nanoparticles, and also for their quenching to the bulk operating temperature. Particle size can be controlled by adjusting the pressure and the solution retention time in the cavitation chamber. Use of the hydrodynamic cavitation for the same purpose has also reported in some literature. [*NanoBioTech News*, Vol 3, Number 6, 9 Feb. 2005].

However, none of the literature available reports use of cavitation techniques in the reduction of the size of elastic particulate material to nano levels.

OBJECTS OF THE INVENTION

It is an important object of the present invention to provide an energy efficient and versatile method for the preparation of nanosuspension/nanoemulsion of elastic materials using hydrodynamic cavitation.

It is a further object of the invention to provide a method for the preparation of naosuspension/nanoemulsion of elastic materials by correlating the cavity dynamics with the properties of material to be ground.

It is a further object of the invention to provide a method for the preparation of naosuspension/nanoemulsion of elastic material using hydrodynamic cavitation process which reduces the energy requirements by more than 2 orders.

It is a further object of the invention to quantitatively establish the link between cavity dynamics and wet grinding/emulsification phenomena to provide a method for the preparation of naosuspension/nanoemulsion of elastic material using hydrodynamic cavitation process As SBR particles are elastic in nature, conventional methods of size reductions such as impacting, grinding are unable to achieve the final size. Therefore, there is need in the art for an effective and simple process for reducing elastic material to nanoscale.

DESCRIPTION OF THE INVENTION

In the present invention, attempts have been made to reduce the size of the rubber latex particles (Styrene Butadiene Rubber) present in the form of aqueous suspension with 275 microns particle initial size to the nano scale. Acoustic as well as hydrodynamic cavitation methods have been used to meet the objective. The mechanism of cavitation and theory of size reduction has been taken into consideration to obtain and explain the formation of the aqueous nanosuspension of the SBR. The present invention has successfully and unexpectedly achieved preparation of nanoparticles of the SBR employing cavitation technique. While, both acoustic and hydrodynamic cavitation techniques were been employed, hydrodynamic cavitation was found to be to be more energy efficient than the acoustic cavitation on the basis of various parameters. The maximum production rate equivalent to 2 kg/hr (solid processing) has been achieved employing carefully selected parameters using newly developed Hydrodynamic Cavitation set up (made in house).

Accordingly, the present invention provides a method for the preparation of nanosuspension/nanoemulsion of elastic materials which comprises passing a cavitation liquid through a hydrodynamic cavitation device having a cavitation plate with one or more orifices, passage of said liquid through said one or more orifices causing the pressure of said liquid to drop so as to generate multitude of cavities, simultaneously, feeding a suspension of particulate material to a hydrodynamic cavitation device and circulating said suspension through said cavities, allowing the pressure of said cavitation liquid to recover resulting in collapsing said cavities, collapsing of said cavities causing size reduction of said particulate material, characterized in that said particulate material is an elastic particulate material having an average particle size of 600 to 1000 microns, wherein said hydrodynamic cavitation device is operated at a pressure of 3 to 20 bars and at a velocity of 10 to 40 m/s.

In a preferred feature, said one or more orifices have a diameter of $0.6 \times 10^{-3}$ m.

In another preferred feature, said hydrodynamic cavitation device is operated at a pressure of 11 atm.

In another preferred feature, the liquid flow rate is maintained at $34.8 \times 10^{-3}$ m$^3$/h.

BRIEF DESCRIPTION OF THE ACCOMPANYING DRAWINGS

The present invention will be described in greater detail with reference to the following non-limiting examples and the accompanying drawings wherein:

FIG. 1: Ultrasonic bath sonification set up;

FIG. 2: Ultrasonic horn set up;

FIG. 3: Schematic representation of HC 1 set up in accordance with the present invention;

FIG. 4: Schematic representation of HC 2 set up in accordance with the present invention;

FIG. 5: SEM image of the rubber latex particles.

EXAMPLE 1

Acoustic Cavitation:

The specifications of the equipments used are as follows:

Ultrasonic Bath:
Make: Supersonics
Frequency: 22 kHz
Rated output power: 120 W
Calorimetric efficiency: 34.69% [16]
Dimensions of bath: 0.15 m×0.15 m×0.14 m
Surface area of ultrasound irradiating face: $2.25 \times 10^{-2}$ m$^2$
Intensity of irradiation: $1.85 \times 10^3$ W/m$^2$ The 12% (by weight) suspension of aqueous SBR was sonicated in the ultrasonic bath for 3 hrs. The suspension was kept in a beaker and the beaker was kept in the bath for sonication as shown in FIG. 1. In the next experiment the suspension was diluted further to 6% and 3.6% by weight of solids and sonicated for further 3 hours.

The second type of equipment was the direct immersion type ultrasonic horn of two different power ratings.

EXAMPLE 2

Ultrasonic Horn (I):
Make: Dakshin
Frequency: 22 kHz
Rated output power: 240 W
Calorimetric efficiency: 6% [16]
Diameter of stainless steel tip of horn: $2.1 \times 10^{-2}$ m
Surface area of ultrasound irradiating face: $3.46 \times 10^{-4}$ m$^2$
Intensity: $4.16 \times 10^4$ W/m$^2$ The various concentrations of aqueous SBR suspensions were made and sonicated in beaker using above mentioned ultrasonic horn as shown in FIG. 2. 12%, 6% and 3.6% SBR suspensions (by weight) were sonicated for 1.5 hrs. For 12% SBR concentration, actual delivered power was 13.8 W with the original suspension volume being $20 \times 10^{-6}$ m$^3$ equivalent to $2.4 \times 10^{-3}$ kg of solids giving net energy dissipation rate of $6.9 \times 10^2$ kW/m$^3$ as estimated calorimetrically.

EXAMPLE 3

Ultrasonic Horn (II):
Make: Ace
Frequency: 22 kHz
Rated output power: 750 W (at 60% amplitude 450 W)
Calorimetric efficiency: 10% [16]
Diameter of stainless steel tip of horn: $1.3 \times 10^{-2}$ m
Surface area of ultrasound irradiating face: $1.32 \times 10^{-4}$ m$^2$
Intensity: $3.4 \times 10^5$ W/m$^2$ As can be seen from the above specifications that energy dissipation level of the Ace horn are significantly higher than Dakshin horn with 60% amplitude rating (450 W) (actual delivered power is 45 W with suspension volume being $60 \times 10^{-6}$ m$^3$ equivalent to $2.16 \times 10^{-3}$ kg of solids giving net energy dissipation rate of $7.5 \times 10^2$ kW/m$^3$). The liquid was sonicated for 1 hr. The experimental set up was identical to that shown in FIG. 2.

EXAMPLE 4

Hydrodynamic Cavitation:

The equipment used for hydrodynamic cavitation studies was essentially multiple hole orifice plate and other details are as follows:

Details of Hydrodynamic cavitation experimental set up 1 (HC1 set up) used are:
Make: In house
Operating capacity: $50 \times 10^{-3}$ m$^3$/batch
Circulating pump: centrifugal pump coupled with 7.5 hp electric motor
Diameter of pipe: $3.5 \times 10^{-2}$ m
Diameter of orifice hole: $1 \times 10^{-3}$ m
No. of holes on the orifice plate: 33
Operating pressure: 4.2 atm The method was carried out with hydrodynamic cavitation setup as shown in FIG. 3. There is an arrangement to bypass the flow i.e., by pass line 6 to control the inlet pressure (up stream) and the liquid flow rate through the main line 1 which holds the cavitating device. The outlet pressure (down stream) is always kept at atmospheric pressure as the discharge is in an open tank 2. The arrangement of the holes 4 on the plate 5 is shown in FIG. 3. The inlet pressure (upstream) was maintained at 4.2 atm to get the liquid flow rate through the orifice plate 5 at $333 \times 10^{-6}$ m$^3$/sec. The average fluid (suspension) velocities at the orifice 4 were 12.84 m/sec giving the cavitation number (as defined in Eq. 1) as 1.87. The estimated energy dissipation level in the cavitation zone is $7.10 \times 10^2$ kW/m$^3$, based on the volume of the cavitation zone, downstream of the orifice plate 5 which is comparable to the one used in both the acoustic cavitation set ups. The method of estimation of the energy dissipation has been discussed in the Appendix (I).

The aqueous suspension of 6% (3 kg solids in $50 \times 10^{-3}$ m$^3$) by weight of rubber latex suspension was used as a starting liquid. Initial mean particle size of the latex in the suspension was 275 microns. The suspension was recirculated for 3 hrs (equivalent to 32 passes) and sample was taken for the particle size measurement.

Details of Hydrodynamic Cavitation Experimental Set Up 2 (HC2 Set Up) are:
Make: In house
Operating capacity: $50 \times 10^{-3}$ m$^3$/batch
Circulating pump: plunger pump coupled with 1 hp electric motor
Diameter of pipe: $3.175 \times 10^{-2}$ m
Diameter of orifice hole: $0.6 \times 10^{-3}$ m
No. of holes on the orifice plate: 1
Operating pressure: 11 atm Alternative hydrodynamic cavitation set up was designed to achieve higher orifice velocities and lower cavitation number to improve the cavitation intensity. The HC2 setup is as shown in FIG. 4. The positive displacement (plunger type) pump 1 driven by 1 hp motor (not shown) was used for the circulation of the liquid. The orifice plate 5 used had a single hole 4 of 0.6 mm diameter at the center. The liquid flow rate was maintained at $34.8 \times 10^{-3}$ m$^3$/hr using a metering pump giving an orifice velocity of 34 m/sec. The cavitation number (Eq.1) at these operating conditions was estimated to be 0.18. The energy dissipation level was estimated to be 16.6 kW/m$^3$ (order of magnitude lower than acoustic and HC1 set up) (estimated by the method in the Appendix (I)). For the HC2 system already processed 6% aqueous suspension from HC1 was used as a starting material. It had a mean particle size of 129 nm. The samples were taken out after each circulation.

Size Measurement Techniques:

Particle size analysis was performed using two different methods. The data of particle size measured using SEM was used to calibrate the Coulter in terms of various properties of rubber particles which can not be measured in the size range of the rubber particles obtained (like refractive index). Coulter was calibrated in terms of the various constants required for the system and then used to measure the particle size distribution of entire samples. First SEM (JEOL-6380LA) was used to measure the size of the particles. The sample collected was diluted to the required extent using ultra pure water. The solution was nebulized and collected on conductive carbon tape. After drying the latex particles obtained on carbon tape, the particles were coated with platinum using sputter coater. The images were then obtained using scanning electron microscope and analyzed for the particle size. Sample image is as shown in FIG. 5. The same sample was then scanned using Laser diffractometry (LD) using the Coulter LS 230 from Beckmann-Coulter (Krefeld, Germany). The laser when incident on the particle, gets diffracted through the angle based on the size of the particle. The results were compared with the results obtained by SEM. The parameters were set to get the same results in terms of the particle size. One more sample was measured by SEM and Coulter to check the confidence level. Samples collected for various runs were then diluted to the required extent using ultrapure water and were similarly analyzed with LD. The diffractometer yields a volume distribution. It counts the number of particles as well as the size of the particle. Coulter was used to measure the particle size as the number of particles measured in a single scan was higher than in SEM, though SEM gives the real picture which can be analyzed using image analysis technique. Also, time required for measurements is less than SEM and it is more easy to prepare the sample for LD as only dilution is required. The particle size is reported in terms of the mean diameter and the variation from the mean diameter. E.g. Particle size of 100 nm with 10% variation means the 90% of the particles measured are having size of less than 100 nm and 10% particles are larger than 100 nm. Although the typical particle size distribution has not been obtained by this method.

Results

In the case of ultrasonic bath, there was absolutely no change in the size of rubber latex particles at all the solid concentration levels studied. The initial particle size of 275 microns remained unaffected even after 2 hrs of treatment in the sonication bath. The reason for this can be explained on the basis of energy dissipation levels. The suspension was kept in a beaker and the beaker was kept in the bath. Though the efficiency of the bath was 34.69%, only 3% of that energy was transferred to the suspension in the beaker [N. N. Mahamuni, A. B. Pandit, *Ultrasonics Sonochemistry*, 13 (2006) 165-174]. Even though an independent experiments with the decomposition of aqueous KI solution in the beaker, confirmed the occurrence of cavitation, the number and intensity of the cavitational events were insignificant to alter (reduce) the particle size in 3 hrs of irradiation.

In the case of the Dakshin horn (I), for the experiments carried out with 12%, 6% and 3.6% by weight of SBR concentration, the mean particle size observed were 400 nm, 80 nm and 60 nm respectively at the end of 1.5 hrs of processing from an initial particle size of 275 microns. The confirmation of the effect of the solid concentration and the processing time was made using 3.6% by weight of solids in suspension and extending the sonication period to 2 hr. The mean particle size obtained was 60 nm with 12% variation. Thus, it was observed that the concentration of the solids present in the suspension plays an important role while carrying out the size reduction. As the solid concentration decreases, the final (equilibrium) particle size also decreases. Also, increase in the sonication time to 2 hrs could reduce the variation. As for 1.5 hr sonication the variation was too large to measure it and for 2 hr sonication the variation was reduced to 12%.

For the case of Ace horn (II, higher energy dissipation rate), the mean particle size obtained was 40 nm with 10% variation within 1 hr of irradiation time starting with 275 microns of initial size with 3.6% solids in the suspension. This was the lowest final size of the rubber particles, which could be achieved with acoustic cavitation with a scale of the operation of only $60 \times 10^{-6}$ m$^3$/batch (with 3.6% rubber particles initial concentrations).

In the HC1 set up, the mean particle size after circulation for 3 hours (72 passes) was 129 nm with less than 2% variation. This was the least size of the rubber particles which could be obtained for the energy dissipation level in the HC1 setup. The important consideration in the HC1 experiment was the lowest variation (2%) with an increased scale of operation ($50 \times 10^{-3}$ m$^3$ of suspension). Though, desired size of 40 nm could not be achieved in HC1 set up, the rate of the production (processing) for HC1 set up works out to be 1 kg of the solids per hour which is substantially higher as compared to the acoustic cavitation method as well as conventional methods like ball mill or gas phase synthesis [Internet source www.wtec.org/loyola/nano/02_04.htm].

In the HC2 set up, working with $50 \times 10^{-3}$ m$^3$ of the suspension volume, the mean particle size obtained after first circulation (one pass through the cavitating volume) was 80 nm with 8-10% variation in the size starting with 129 nm initial mean size and 2% variation. This 80 nm suspension was used for the second circulation and mean particle size was reduced to 70 nm, again with 8-10% variation in the size distribution. Then 70 nm size particle suspension was circulated third time and a mean size of 35 nm with less than 2% variation was obtained. For the fourth circulation, this 35 nm suspension was used as a initial liquid and a mean particle size of 20 nm again with less than 2% variation was obtained. The fourth liquid circulation was carried out to check the minimum size (equilibrium) of the particles obtained in HC2 set up and at given operating conditions. Fifth circulation (with a starting size of 20 nm) of the solution gave the particle size of 50 nm. The reason behind this increased size can be explained on the basis of the cavitational effect. When the high velocity intraparticle collision takes place, if the collision is at a direct angle, particles collision can occur at very high velocities, which induces effective melting at the point of collision. Suslick have reported similar observation in the case of zinc particles [S. J. Docktycz, K. S. Suslick, *Science*, 247, 1990, 1067]. The particle size measurement in such case gives higher size value. In the FIG. 5, this effect can be seen clearly.

In the present situation, rubber latex of 20 nm size may be the limiting size (equilibrium with a local energy dissipation rate). The sample (having mean particle size of 35 nm, third pass) prepared using HC2 was again analyzed for the mean particle size two months after the preparation. The samples were stored at room temperature in air tight plastic cans. The size of the particles was observed to be the same as that at the time of preparation. All the results and the various calculated parameters are presented in the Table 1. The detail of the sample calculation giving the numbers in Table 1 is given in the Appendix (I).

Discussion:

In the hydrodynamic or acoustic cavitation set up, there are two possible reasons for the observed size reduction. One of the possibilities is that, when a cavity collapse takes place, the shock wave generated travels through the liquid media generating local pressure gradient and fluid shear causing attrition of the solid particles and the reduction in the particle size. Other possibility is that when the cavity collapses, asymmetrically on the surface of the solid surface it produces a high velocity liquid jet pointing towards the particle surface which results into an action similar to the liquid jet cutting. It is not known conclusively, which of the mechanism could be the dominating mechanism in the present experimental work though the form and the quantum of energy dissipation can throw some light on this. Analysis of the energy requirement for the observed size reduction in terms work index may throw some light on this aspect as is discussed later.

Cavitation Conditions

The numerical simulations of the cavity dynamics were carried out previously [S. N. Gastgar, *M Chem Engg. Thesis, MUICT*, Mumbai, 2004] and the dependence of the operating parameters on the cavity collapse pressures and temperatures on various operating parameters has been studied for acoustic as well as hydrodynamic cavitation. The final cavity collapse pressures and the temperatures in the case of acoustic cavitation are mainly dependent on the intensity and frequency of the irradiation. In the case of hydrodynamic cavitation the cavity collapse pressures and temperatures mainly depend on the orifice velocities and downstream pressure recovery conditions. The simulated collapse pressures and temperatures for all systems used under the operating conditions are in the range of 4000 atm and 1700 K showing transient cavitation (i.e. cavity collapses within single cycle) except for the operating conditions of HC2 set up. In HC2 set up the maximum pressures and temperatures for each cavity oscillation (stable cavitation) are only in the range of 12 atm and 500 K. One would expect to get finer suspension size with increasing cavity collapse pressure but the experimental results of the invention unexpectedly show a different behavior, indicating that a stable or oscillating cavity is better for the size reduction in this situation than the collapsing cavity. This has been discussed in detail in the following sections.

Comparison:

Especially, in the case of the hydrodynamic cavitation as compared to the acoustic cavitation, the particle size variation seems to be lower. This indicates a very high degree of mixing and the uniformity within the cavitation zone. Also, energy distribution in the cavitation zone appears to be more uniform in the case of the hydrodynamic cavitation than the acoustic cavitation. The reason for this observation may be the better spatial distribution of the collapsing or oscillating cavities in the cavitating medium in the former. Hydrodynamic cavitation has already been proved to be very efficient for the generation of the cavities [P. R. Gogate, I. Z. Shirgaonkar, M. Shivakumar, P. Senthilkumar, N. P. Vichare and A. B. Pandit, *AIChE Journal*, 47 (11), 2001, 2326-38.

A proper distribution of the orifices on the plate is responsible for improved spatial distribution of the collapsing cavities. Energy dissipated per unit volume of the liquid is of the same order for acoustic cavitation and HC1 set up (Table 1), yet the difference observed in the particle size variation (from the mean) for acoustic is significantly higher (12% and 10%) than hydrodynamic cavitation (<2%) using multiple hole orifice plates. Similarly, it can be seen that by reducing the number of holes to 1 (HC2 set up), the variation from the mean increases again to 8 to 10%, possibly due to again the localization of the cavitation effect due to a single hole orifice plate in the HC2 set up. This variation then can be reduced by subjecting the suspension to multiple passes through this single hole.

Limiting/Equilibrium Particle Size:

The lowest particle size observed in each of the set ups and the operating conditions, can be explained on the basis of the basis of the dynamic behavior of the cavity as indicated by numerical simulations [S. N. Gastgar, *M Chem Engg. Thesis, MUICT*, Mumbai, 2004].

Though the energy dissipated per unit volume for HC1 set up ($7.1 \times 10^2$ kW/m$^3$) was one order of magnitude larger than that of HC2 set up (16.6 kW/m$^3$), the final size obtained in the later was smaller. With higher orifice velocities in the HC2 set up, the size reduction is possibly taking place more by attrition in the zone downstream of the orifice due to fluid shear, which appears to be more efficient way of producing smaller particles for a solid material such as rubber having some elasticity. As the simulated collapse pressure pulses are also lower in the case of the HC2 set up, the above explanation is possibly correct. Sample calculations showing this effect are given in Appendix (I) and one can see from these calculations, that rather than the mean (averaged) energy dissipation values, peak (maximum) energy dissipation values decide this limiting reduced particle diameter. This indicates that the average energy dissipation is not the only parameter which decides the final size, but also the distribution and the form of the energy dissipation are equally responsible. Numerical simulation studies [S. N. Gastgar, *M Chem Engg. Thesis, MUICT*, Mumbai, 2004] indicate that except in HC2 set up, in all the cases cavities are transient (single oscillations) and in HC2 set up cavities are in stable mode (multiple oscillations). Transient cavitation gives violent collapse with very high magnitude of temperature and pressure. After collapse of the cavities, shock waves are generated and the size reduction takes place depending upon the strength of the shockwave. In stable cavitation, cavity oscillates many times before collapse and gives low collapse pressures and temperatures compared with transient cavitation. The later, through associated with slow collapse pressures, generate very large fluid shear gradients around the fast oscillating cavities giving rise to mechanical effects like size reduction as the bubble wall velocities are in the range of sound velocities (1500 to 2000 m/s) in the liquid in an alternating directions (towards the centre of the cavity and radially outward), rather than unidirectional velocities in the case of collapsing cavities.

Efficacy of Energy Utilization:

For the comparison of the performance of the two types of cavitating systems over the selected operating ranges, the energy dissipated per kg of the solids ground for each case has been calculated. The energy taken into consideration is the total energy supplied to the system. Based on the solid content of the suspension, energy dissipated per kg of the solid size reduction has been calculated (J/kg). Sample calculation is again shown in the Appendix (I). The energy dissipated per kg of the solids processed (Table 1) clearly indicates that hydrodynamic cavitation is more energy efficient than acoustic cavitation. For acoustic cavitation set up the energy dissipation per kg of the solids varies from $2.52 \times 10^7$ J/kg to $1.38 \times 10^8$ J/kg depending on the operating parameters. While for the hydrodynamic cavitation set up these values vary from $2.026 \times 10^4$ J/kg to $6.316 \times 10^5$ J/kg, showing three orders of magnitude reduction in the latter case. Since, in the acoustic cavitation case, the fluid velocities due to acoustic streaming are significantly lower (2 order of magnitude lower of the order of 0.5 m/s) [Ajaykumar, PhD (*Tech.*) *Thesis, MUICT*, Mumbai, 2005] than hydrodynamic cavitation set up (velocities of the order of 10 to 30 m/s), it again suggests, that rather than impact grinding (cavity collapse pressure, releasing shock wave), shear grinding or turbulent shear as a result of the stable oscillating cavity appears to be the controlling mechanism of size reduction in this case.

Creation of New Surface:

Energy required to create new surface area is calculated for each of the experiments and the results are reported in Table 1. For the same system (rubber latex suspension) the energy required to create new surface are observed to be a function of the type of the equipment used, operating parameters and the solids' concentrations. The range of the energy required to create new surface area was found to be in the range of $1.58 \times 10^{-1}$ J/m$^2$ to $2.073 \times 10^3$ J/m$^2$, again showing over 4 orders of magnitude of variations depending on the system and operating conditions. This again confirms the role of the type of grinding mechanism in deciding the relation between the energy supply and the increase in the surface energy (area×interfacial tension) of the system.

Work Index Calculations:

Work Index (WI) is calculated on the basis of the total energy supplied to the system for the reduction in size and increase in the particle surface area. From the knowledge of the Work Index for the various equipments, (for the same material) it is possible to find out the right kind of the equipment with optimized operating parameters for a specific grinding operation. It also suggests the possible mechanism responsible for the observed the size reduction, if one compares the WI values calculated in this work, with the WI values reported in the literature [*Perry's Chemical Engg. Handbook*, pp 8-11]. For the present system the range of the work index (WI) is from 20.53 to 9452 as reported in Table 1 (The details of the calculations are given in Appendix (I)). This again confirms that the mode and the intensity of energy dissipation are more important than the total quantum of energy dissipation to obtain particles of a specific size.

Cost Estimation

The cost of size reduction includes the operating cost (electricity consumption). The amount of electricity required to run the equipment was calculated knowing the rated power of the equipment to reduce the material from an initial size to the final size. The presented data from Table 1 shows that the operating cost per kg of the processed solids of a given initial sizes to the final sizes. Sample calculation is given in the Appendix (I).

For the size reduction of the rubber latex particles, various equipments under different operating conditions have been used. For each of the equipment used, various parameters responsible for its observed performance have been calculated to study the effect of the operating parameters on the extent of size reduction. From Table 1, it can be seen that, the hydrodynamic cavitation set up appears significantly cost effective in reducing the size of the elastic material like rubber to the nano scale.

Scale Up Issues Related with Acoustic Cavitation:

Scale-up of such process is of great interest for nanoparticle synthesis. High energy ball milling in terms of high-volume process has been instrumental in generating nanoparticles for the preparation of magnetic, structural, and catalytic materials. However, the process produces polydispersed (large variation) amorphous powder, which requires subsequent partial recrystallization or segregation (which is very difficult) before the powder is consolidated into nanostructured materials. Also, a great care in terms of contamination is required for these kinds of secondary operations. Although gas-phase synthesis is generally used for low production rate processes (typically in the 100 mg per hour range) in research laboratories, higher rates of production (about 20 g per hour) are also being demonstrated [Internet source www.wtec.org/loyola/nano/02_04.htm]. Even higher production rates (about 1 kg per hour) are now being achieved commercially with gas phase nanoparticle synthesis processes. [Internet source www.wtec.org/loyola/nano/02_04.htm]

In the present invention, using the acoustic cavitation, it was observed that by adjusting the operating parameters the desired final size of the particles (~40 nm) with a very low polydispersity (<2%) could be achieved. But the maximum scale of the operation was limited to the processing of $2.4 \times 10^{-3}$ kg/hr of solids. In acoustic cavitation system, the cavitation zone starts from the surface of the horn and extends in the bulk liquid along the axial direction. As the axial distance from the horn tip increases, the cavitational activity and cavitaional intensity in the liquid media decreases [P. M. Kanthale, P. R. Gogate, A. B. Pandit and A. M. Wilhelm, *Ultrasonics Sonochemistry*, Volume 10, Issue 6, October 2003, Pages 331-335]. So the available active cavitational volume where the actual size reduction is taking place is small. Much of the energy supplied is dissipated in generating liquid circulatory currents lowering the size reduction operation efficiency of the system in terms of the number of the cavitational events and the subsequent size reduction.

Advantages of the hydrodynamic cavitation over acoustic cavitation have already been discussed. Again to overcome the scale up issues, same advantages can be considered effectively. To increase the cavitational volume in the case of acoustic cavitation set up, it is necessary to use multiple transducer system. Using multiple transducers creates the interference pattern and expected cavitation pattern is not obtained. The cavitational volume (Pressure recovery in the case of pipe flow takes place within 8 times the pipe diameter, so the volume present in that length of the pipe is considered as cavitational volume) in the case of hydrodynamic cavitation is a function of pipe diameter. So depending upon the extent of size reduction required and the quantum of amount to be processed the set up in terms of pipe diameter and orifice opening (orifice diameter, number of holes in orifice and arrangement of holes on the orifice) can be easily modified along with an increased pumping capacity. And adjusting the operating conditions (maintenance of Cv) the required goal of size reduction can be achieved on practically any scale of operation.

Conclusions:

1. The hydrodynamic cavitation has proved to be very effective in reducing the size of the elastic material like rubber efficiently. HC2 is more efficient compared to all the equipments tested in this work. Acoustic cavitation set up can do the size reduction by adjusting the operating parameters such as increasing the power input per unit volume and/or irradiation intensity ($W/m^2$) and decreasing the solid concentrations. The time of the operation varies depending on the final required size and the extent of permissible variation.
2. The mechanism of size reduction appears to be shear and attrition, caused by the cavitation phenomenon. Rather than transient cavitation (single high magnitude pressure probe), stable cavitation (multiple oscillation and high fluid shear) shows higher efficacy for size reduction, as in stable cavitation fluid shear direction changes along with the oscillations of the cavity (towards the center of the cavity during contraction and in outward direction during the expansion of the cavity).
3. The stability of the suspension prepared by HC2 set up was very good even after 2 months.
4. The systems used in this work can also be used for the size reduction of hard and brittle materials as such but may show a different mechanism of the size reduction and hence different equipment (may be transient cavitation) may show higher energy efficiency.

Appendix (I)

To calculate the various parameters associated with size reduction, some assumptions were made. Firstly size was assumed to be the mean size and variation was taken as zero (i.e. all particles were of same size and no variation at all). The particles were assumed to be perfectly spherical, the SEM image clearly indicates the sphericity.

Energy Balance Calculations:

For Ultrasonic Systems:

Case 1: Dakshin horn 230 W, 20 kHz, 1.5 hrs, (efficiency of the horn=6%), 12% solid concentrations, initial size 275 microns, final equilibrium size 400 nm $$\text{Net energy dissipated} = 230 \text{ J/sec} \times 1.5 \text{ hr} \times 3600 \text{ sec/hr} \times 0.06$$
$$= 7.452 \times 10^4 \text{ J}$$

$$\text{Energy dissipated per unit volume of liquid} = (230 \times 0.06)/20 \times 10^{-6}$$
$$= 6.9 \times 10^5 \text{ W/m}^3$$

$$\text{Net energy dissipated/kg of solids} = 74520 \text{ J}/2.4 \times 10^{-3} \text{ kg}$$
$$= 3.105 \times 10^7 \text{ J/kg}$$

Initial volume of the each particle (considering the spherical particle)

$$(\text{initial size} = 275 \text{ microns}) = (1/6) \times (\text{pi}) \times (275 \times 10^{-6})^3$$
$$= 1.089 \times 10^{-11} \text{ m}^3$$

Density of the solids=1000 $kg/m^3$ $$\text{Initial mass of each particle} = (1.089 \times 10^{-11}) \text{ m}^3 \times 1000 \text{ kg/m}^3$$
$$= 1.089 \times 10^{-8} \text{ kg}$$

-continued

Initial number of the particles = 0.0024 kg/$1.089 \times 10^{-8}$ kg/particle
$$= 220373$$

Initial surface area of each particle = $(pi) \times D_1^2$
$$= 2.38 \times 10^{-7} \, m^2$$

Initial total surface area = $(2.38 \times 10^{-7}) \, m^2 \times 220373$
$$= 0.052 \, m^2$$

Final volume of each particle (considering the spherical particle) (final size=400 nm)=$(1/6) \times (pi) \times (0.4 \times 10^{-6})^3 = 3.35 \times 10^{-20} \, m^3$ Final mass of each particle = $(3.35 \times 10^{-20}) \, m^3 \times 1000 \, kg/m^3$
$$= 3.35 \times 10^{-17} \, kg$$

Final number of the particles = 0.0024 Kg/$3.35 \times 10^{-17}$ kg/particle
$$= 7.16104 \times 10^{13}$$

Final surface area of each particle = $(pi) \times D_2^2$
$$= 5.027 \times 10^{-13} \, m^2$$

Final total surface area = $(5.027 \times 10^{-7}) \, m^2 \times 7.16104 \times 10^{13}$
$$= 36 \, m^2$$

Increase in the surface area = $36 - 0.052$
$$= 35.95 \, m^2$$

Total Energy utilized for increasing the surface area=74520 J

So, energy utilized to create new surface area = 74520 J/35.95 $m^2$
$$= 2073 \, J/m^2$$

Energy required for size reduction in terms of Work index calculations:

$$\frac{P}{m} = 0.3162 \times Wi \times \left( \frac{1}{\sqrt{D_{pb}}} - \frac{1}{\sqrt{D_{pa}}} \right)$$

$P$: Power required in kW $m$: Solid flow rate in Tons/hr $D_{pa}, D_{pb}$: Initial and final particle size in mm Solid flow rate = $1.6 \times 10^{-3}$ kg/hr
$$= 1.6 \times 10^{-6} \, Tons/hr$$

Power supplied = 230 W
$$= 0.230 \, kW$$

$D_{pa} = 275 \times 10^{-3}$ mm $D_{pb} = 0.4 \times 10^{-3}$ mm

So, Work Index for the rubber latex particles came to be 9452.86. (For the calculation of the work index total electrical power is considered as work index takes care of the efficiency of the equipments used.)

Electrical power consumed = (230 W × 1.5 hr)
$$= 345 \, W \, hr$$
$$= 0.345 \, kW \, hr$$

Cost of the electricity = 0.345 kW hr × 4.0 Rs/kW hr
$$= Rs \, 1.38$$

Total electrical cost = 1.38 Rs/$2.4 \times 10^{-3}$ kg of the solids processed
$$= 575 \, Rs/kg$$

So, the operating cost for getting 400 nm rubber particles from initial size of 275 micron in the form of suspension (6% solids) is 575 Rs/kg of the solids.

Reduction ratio = initial particle size / final particle size
$$= 275/0.4$$
$$= 687.5$$

*Cost/kg* of the solids *processes/unit* size reduction = 575/687.5
$$= 0.836 \, Rs/kg$$

For Hydrodynamic Cavitation System:

Case 6: HC1 setup, 4.2 atm pressure drop, 3 hrs

Total Electrical Energy consumed=$5.994 \times 10^7$ J (for 3 hrs)

Energy associated with the liquid = absolute inlet pressure × flow rate
$$= 526890 \, N/m^2 \times$$
$$(0.333 \times 10^{-3}) \, m^3/sec$$
$$= 175.45 \, W$$

$$\text{Efficiency} = \left( \frac{\text{energy associated with the liquid}}{\text{energy supplied to the pump}} \right) \times 100$$
$$= (175/5550) \times 100$$
$$= 3.16\%$$

(The pressure recovery takes place within the length of 8 times pipe diameter. The Cavitational volume is considered as the volume of the liquid in pressure recovery zone. i.e. 8 times of the pipe diameter.) [24]

Cavitational volume = $\pi/4 \times (dia \, of \, pipe)^2 \times (length \, i.e. \, 8 \times dia \, of \, pipe)$
$$= \pi/4 \times (34 \times 10^{-3})^2 \times (8 \times 34 \times 10^{-3})$$
$$= 2.47 \times 10^{-4} \, m^3$$

Energy dissipated per unit volume of liquid = $(175.45)/2.47 \times 10^{-4}$
$$= 7.1 \times 10^5 \, W/m^3$$

All the subsequent parameters are calculated in a manner identical to the previous case.

Energy dissipated/kg of solids processed=$6.32 \times 10^5$ J/kg
Energy utilized to create new surface area=13.58 N/m
Work Index for the rubber latex particles came to be 203.
Electrical power consumed=5.55 units/hr
Cost of the electricity=22.2 Rs/hr
Total electrical cost=Rs 66.6.
Solid concentration=6% (3 kg solids)

So, the operating cost for getting 129 nm rubber particals from initial size of 275 micron in the form of suspension is 22.2 Rs/kg of the solids processed.

Reduction ratio = initial particle size/final particle size
= 2131.78

Cost/kg of the solids processes/unit size reduction=0.010 Rs/kg

Case 6: HC2 (Plunger pump set up), 11 atm pressure drop, $1^{st}$ circulation
Total Electrical Energy consumed=2664000 J
Energy associated with the liquid=13.137 W
Efficiency=1.78%

(The Cavitational volume is considered as the volume of the liquid in pressure recovery zone. i.e. 8 times of the pipe diameter.) [24]
Cavitational volume=$2.01 \times 10^{-4}$ m$^3$
Energy dissipated per unit volume of liquid=$6.54 \times 10^4$ W/m$^3$
Energy of solids processed=20.26 J/gm
Energy utilized to create new surface area=0.712 N/m
Work index for the rubber latex particles came to be 47.17.
The operating cost for getting 70 nm rubber particles from initial size of 129 nm in the form of suspension is 1.42 Rs/kg of the solids.
Reduction ratio=initial particle size/final particle size=1.84
Cost/kg of the solids processes/unit size reduction=0.77 Rs

TABLE 1

| Case No. | Condition and time of operation | Particle size (nm) Initial | Particle size (nm) Final | Variation in final size | *Energy dissipated/ volume (W/m$^3$) | *Energy dissipated/ kg solids (J/kg) | Energy required to create new surface area (N/m) | Work index calculated | Operating Cost/kg solids (Rs) | Energy dissipated/ particle | Reduction ratio |
|---|---|---|---|---|---|---|---|---|---|---|---|
| 1 | Dakshin horn 230 W, 20 kHz, 1.5 hrs, 20 ml 12% suspension, | $2.75 \times 10^5$ | 400 | NA# | $6.9 \times 10^5$ | $3.105 \times 10^7$ | 2073 | 9452 | 575 | $3.38 \times 10^{-1}$ | 68.75 |
| 2 | Dakshin horn 230 W, 20 kHz, 1.5 hrs, 20 ml 6% suspension | $2.75 \times 10^5$ | 80 | NA# | $6.9 \times 10^5$ | $6.210 \times 10^7$ | 828 | 8273 | 1150 | $6.76 \times 10^{-1}$ | 3437.5 |
| 3 | Dakshin horn 230 W, 20 kHz, 1.5 hrs 20 ml 3.6% suspension | $2.75 \times 10^5$ | 60 | NA# | $6.9 \times 10^5$ | $1.035 \times 10^8$ | 1035 | 11914 | 1917 | 1.13 | 4583.33 |
| 4 | Dakshin horn 230 W, 20 kHz, 2 hrs, 20 ml 3.6% suspension | $2.75 \times 10^5$ | 60 | 12% | $6.9 \times 10^5$ | $1.380 \times 10^8$ | 1380 | 15885 | 2556 | 1.50 | 4583.33 |
| 5 | Ace horn, 420 W, 20 kHz, 1 hr, 60 ml 6% suspension | $2.75 \times 10^5$ | 40 | 10% | $7.5 \times 10^5$ | $2.520 \times 10^7$ | 168 | 2362 | 466 | $2.74 \times 10^{-1}$ | 6875 |
| 6 | HC1 setup, 4.2 atm pressure drop, 3 hrs, 50 lit 6% suspension | $2.75 \times 10^5$ | 129 | <2% | $7.10 \times 10^5$ | $6.316 \times 10^5$ | 13.6 | 203 | 22.2 | $6.88 \times 10^{-3}$ | 2131.8 |
| 7 | HC2 set up, 11 atm pressure drop, $1^{st}$ circulation, 34.8 lit 6% suspension | 129 | 80 | 8-10% | $1.66 \times 10^4$ | $2.026 \times 10^4$ | 0.712 | 47.17 | 1.42 | $2.28 \times 10^{-14}$ | 1.61 |
| 8 | HC2 set up, 11 atm pressure drop, $2^{nd}$ circulation, 34.8 lit 6% suspension | 80 | 70 | 8-10% | $1.66 \times 10^4$ | $2.026 \times 10^4$ | 1.89 | 145 | 1.42 | $5.44 \times 10^{-15}$ | 1.14 |
| 9 | HC2 set up, 11 atm pressure drop, $3^{rd}$ circulation, 34.8 lit 6% suspension | 70 | 35 | <2% | $1.66 \times 10^4$ | $2.026 \times 10^4$ | 0.237 | 22.63 | 1.42 | $3.64 \times 10^{-15}$ | 2 |
| 10 | HC2 set up, 11 atm pressure drop, $4^{th}$ circulation, 34.8 lit 6% suspension | 35 | 20 | <2% | $1.66 \times 10^4$ | $2.026 \times 10^4$ | 0.158 | 20.53 | 1.42 | $4.55 \times 10^{-16}$ | 1.75 |

Efficiencies of the system are taken into consideration,
NA# - Variation is too large
HC1 set up - Hydrodynamic set up 1
HC2 set up - Hydrodynamic set up 2

| System | Ultrasonic Bath | Dakshin horn | Ace horn | HC1 Set up | HC2 Set up |
|---|---|---|---|---|---|
| Efficiency (%) | 34.69% | 6 | 10 | 3.16 | 1.78 |

Efficiency is calculated on the basis of the total electrical energy supplied and net energy delivered to the liquid media. (Appendix 1)

The invention claimed is:

1. A method for the preparation of nanosuspension/nanoemulsion of elastic materials which comprises passing a cavitating liquid through a hydrodynamic cavitation device having a cavitation plate with one or more orifices, passage of said liquid through said one or more orifices causing the pressure of said liquid to drop so as to generate multitude of cavities, simultaneously, feeding a suspension of particulate material to a hydrodynamic cavitation device and circulating said suspension through said cavities, allowing the pressure of said cavitating liquid to recover resulting in collapsing of said cavities, the said collapsing of said cavities and associated high pressure pulse causing size reduction of said particulate material, characterized in that said particulate material is an elastic particulate material having an average particle size of 600 to 1000 microns, wherein said hydrodynamic cavitation device is operated at a pressure of 3 to 20 atm. and at an constriction velocity of 10 to 40 m/s.

2. A method as claimed in claim 1 wherein said one or more orifices have a diameter in the range of 0.6 to 1.0 mm.

3. A method as claimed in claim 1 wherein said hydrodynamic cavitation device is operated at a pressure of 11 atm.

4. A method as claimed in claim 1 wherein the liquid flow rate is maintained in the range of 1200 liters/hr to 34 liters /hr.

5. A method as claimed in claim 1 wherein the feed suspension of said particulate material has a suspension volume of 34 to 50 liters of the suspension volume, the mean particle size obtained after first circulation (one pass through the cavitating volume) was 80 nm with 8-10% variation in the size starting with 129 nm initial mean size and 2% variation.

6. A method as claimed in claim 5 wherein said 80 nm suspension was further circulated through said cavitation device and mean particle size was reduced to 70 nm, with 8-10% variation in the size distribution.

7. A method as claimed in claim 6 wherein said 70 nm size particle suspension was further circulated through said cavitation device and a mean size of 35 nm with less than 2% variation was obtained.

8. A method as claimed in claim 7 wherein said 35 nm suspension was further circulated through said cavitation device and a mean particle size of 20 nm with less than 2% variation was obtained.

9. A method as claimed in claim 1 wherein said elastic material is Styrene Butadiene Rubber.

10. A method as claimed in claim 4 wherein said cavitation plate consists of multiple orifices of about 1 mm diameter each, the liquid flow rate is maintained at about 1200 liters/hr, the operating pressure is about 4.2 atm and the constriction velocity is about 12.74 m/s.

11. A method as claimed in claim 4 wherein said cavitation plate consists of a single orifice of about 0.6 mm diameter, the liquid flow rate is maintained at about 34.4 liters/hr, the operating pressure is about 12 atm and the constriction velocity is about 33.78 m/s.

* * * * *